United States Patent [19]

Lappöhn et al.

[11] Patent Number: 4,964,690
[45] Date of Patent: Oct. 23, 1990

[54] PIN-AND-SOCKET CONNECTOR FOR LIGHT WAVE CONDUCTORS

[75] Inventors: Jürgen Lappöhn, Heiningen; Franz Czeschka, Rechberghausen, both of Fed. Rep. of Germany

[73] Assignee: ERNI Elektroapparate GmbH, Adelberg, Fed. Rep. of Germany

[21] Appl. No.: 364,647

[22] Filed: Jun. 9, 1989

[30] Foreign Application Priority Data

Jun. 9, 1988 [DE] Fed. Rep. of Germany ....... 3819621

[51] Int. Cl.$^5$ ............................................. G02B 6/38
[52] U.S. Cl. ............................................. 350/96.21
[58] Field of Search .................. 350/96.2, 96.21, 96.22

[56] References Cited

U.S. PATENT DOCUMENTS

| 3,948,582 | 4/1976 | Martin | 350/96.21 |
|---|---|---|---|
| 4,167,303 | 9/1979 | Bowen et al. | 350/96.21 |
| 4,186,999 | 2/1980 | Harwood et al. | 350/96.21 |
| 4,415,232 | 11/1983 | Caron | 350/96.21 |
| 4,726,647 | 2/1988 | Kakii et al. | 350/96.21 |
| 4,747,658 | 5/1988 | Borsuk et al. | 350/96.2 |
| 4,838,641 | 6/1989 | Morimoto et al. | 350/96.21 |
| 4,840,451 | 6/1989 | Sampson et al. | 350/96.2 |

FOREIGN PATENT DOCUMENTS

| 2853649 | 6/1979 | Fed. Rep. of Germany . |  |
|---|---|---|---|
| 58-78111 | 5/1983 | Japan | 350/96.2 |

Primary Examiner—John D. Lee
Assistant Examiner—John Ngo
Attorney, Agent, or Firm—Nils H. Ljungman

[57] ABSTRACT

On a pin-and-socket connector for light wave conductors with an apparatus for the automatic axial orientation of the pug pins 2,3 holding the fiber line ends E mounted elastically in a sleeve 1, the guide sleeve 1 located in the plug housing 8 has longitudinal slits 1a on the circumference and an adapter cone 4 positioned on top of it, and in the socket housing 9 there is an adapter sleeve 5, which during the insertion process, after contact has been made between the end surfaces 2a, 3a of the plug pins 2, 3, orients the later in the longitudinal direction L practically without any mutual radial offset.

8 Claims, 2 Drawing Sheets

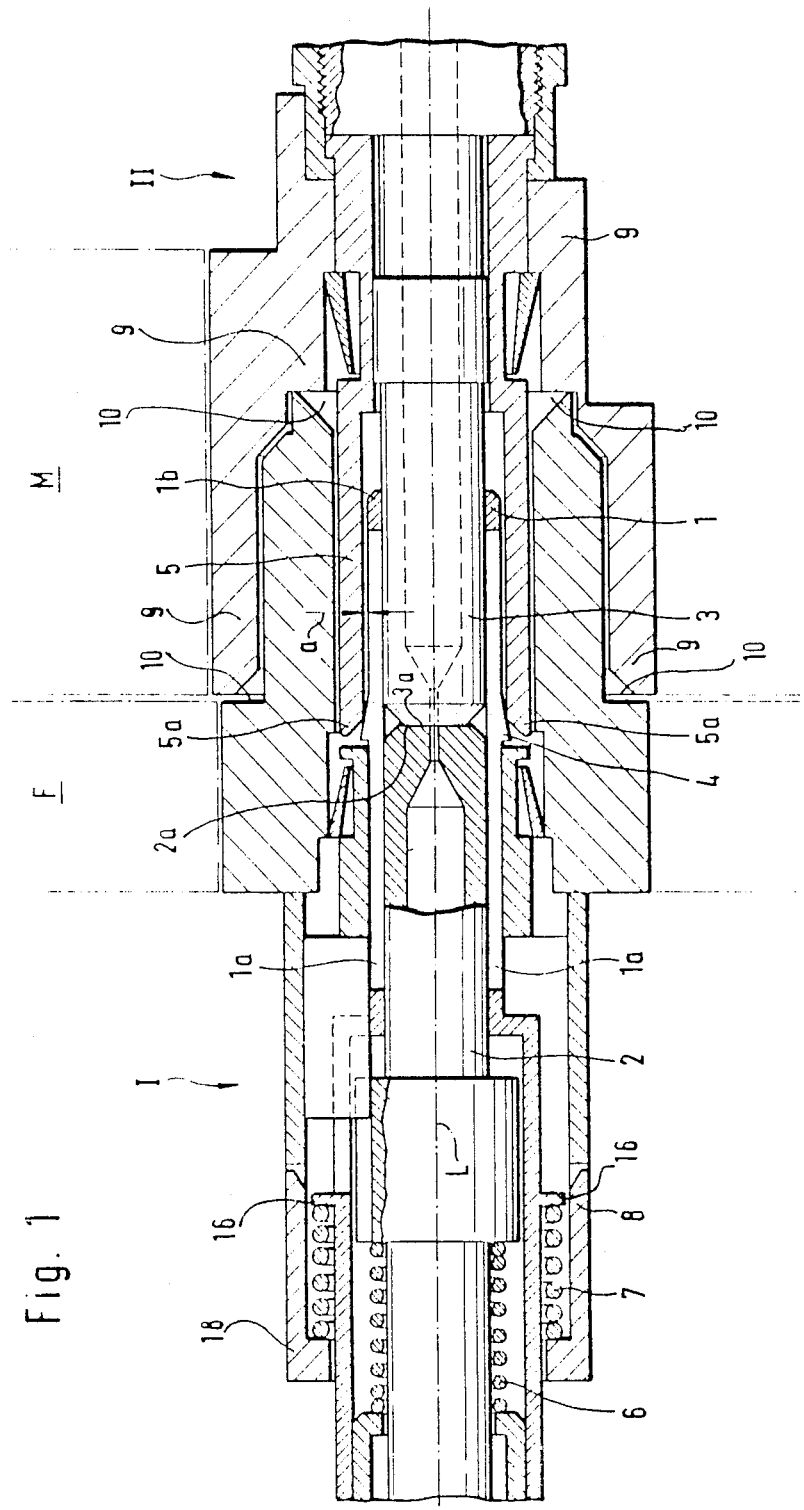

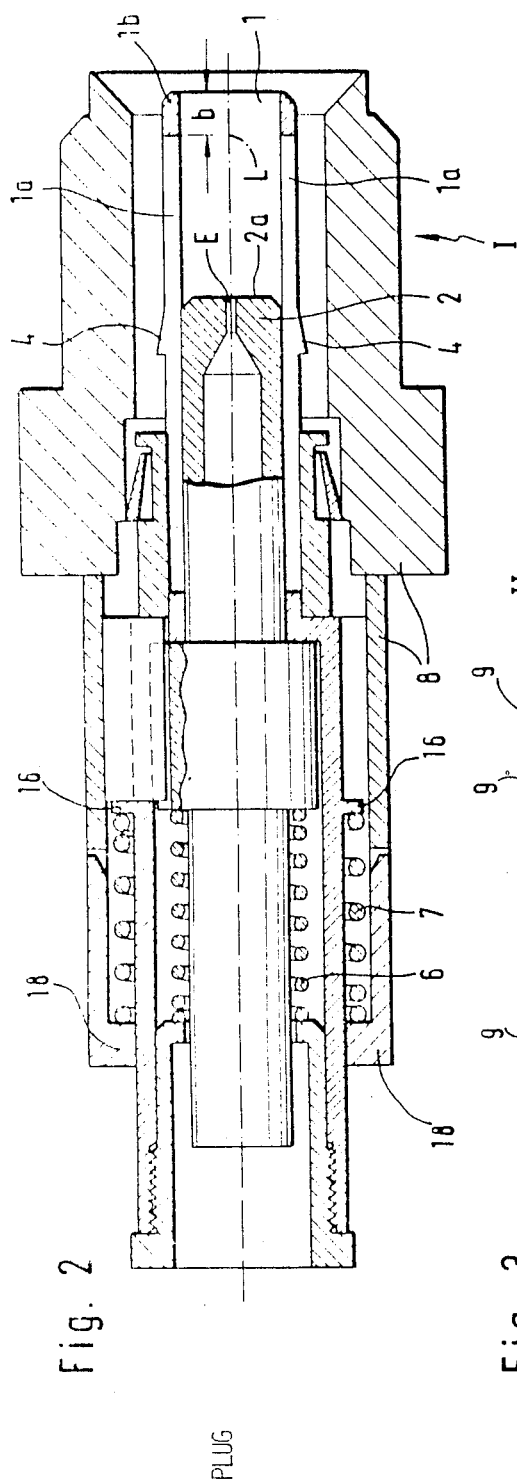

PIN-AND-SOCKET CONNECTOR FOR LIGHT WAVE CONDUCTORS

BACKGROUND OF THE INVENTION

1. Field of the Invention:

This invention relates to a pin-and-socket connector for light wave conductors, such as fiber optic conductors, with an apparatus for the automatic axial orientation of the bared ends of the fiber line.

2. Description of the Prior Art:

Prior art pin-and-socket connectors function similar to the tool holder chuck of a hand drill, wherein spheres apply a radially inward pressure force on the free ends of the fiber conductor in the corresponding plug sleeves so that they are acceptably axially oriented in relation to one another. The precision required for the connection of light wave conductors with such axial orientation of the fiber ends may be approximately achieved by such a design, but only with a great deal of extremely complex and therefore expensive effort.

OBJECT OF THE INVENTION

The object of the present invention is to achieve an even more precise fit, i.e. axial orientation or alignment, with significantly reduced structural and technical complexity to reduce the radial offset in a pin-and-socket connector of the type described above and, therefore, to create a significantly better and more economical pin-and-socket connector for light wave conductors. This object is achieved by the features indicated in the patent claims of the present invention.

BRIEF DESCRIPTION OF THE DRAWINGS

The invention is described in greater detail below on the basis of one embodiment, with reference to the accompanying drawings, in which:

FIG. 1 shows the pin-and-socket connector in accordance with the invention, assembled, in longitudinal section;

FIG. 2 shows the socket part of the pin-and-socket connector as a unit, in longitudinal section: and FIG. 3 shows the plug part of the pin-and-socket connector as a unit, in longitudinal section.

DESCRIPTION OF THE PREFERRED EMBODIMENT

FIGS. 1 through 3 show a pin-and-socket connector which consists of two halves, plug part I and socket part II, in addition to other connecting elements in multipoint plug strip F and M. To reduce undesirable radial offset of ends E, of the fiber conductors to practically zero between plug part I and socket part II and to do so in a simple manner with ample fabrication tolerances, the invention includes guide sleeve 1, for plug pins 2 and 3, longitudinal slits 1a on its jacket surface and adapter cone 4 located in the vicinity of end surfaces 2a and 3a in contact with plug pins 2 and 3. Further, adapter cone 4 is at least partially surrounded by adapter sleeve 5 after mutual contact has been made between the end surfaces 2a and 3a of the plug pins when plug part I and socket part II are connected. During the insertion process, wherein plug part I is connected to socket part II in the longitudinal direction L, adapter cone 4 is surrounded and compressed by the adapter sleeve 5, whereby the gap which was previously present between the plug pins 2 and 3 and guide sleeve 1 is reduced practically to zero.

In one embodiment of this invention, the longitudinally slit guide sleeve 1, slits 1a, adapter cone 4 and plug pin 2, which is axially supported and biased by compression spring 6, are located in half I, of the pin-and-socket connector. Adapter sleeve 5 and unsupported plug pin 3 are located in the other half, II, of the pin-and-socket connector. Guide sleeve 1 and slits 1a are also guided so that they can move axially in the corresponding plug housing 8 by means of spring 7.

In this embodiment springs 6 and 7 produce a defined mutual contact pressure between end surfaces 2a and 3a of the plug pins 2 and 3 by holding the ends E of the fiber line and, simultaneously, as a differential pressure source, produce the force necessary to press together the webs or leaves on guide sleeve 1 which project through the longitudinal slits 1a.

When plug part I is to be connected to socket part II, shoulders 9, of socket II, come in opposing contact with shoulders 10, of plug part I. Further, end surface 3a, of socket II, comes in opposing contact with end surface 2a of plug part I. The opposing contact between surfaces 12 and 14 forces springs 6 to compress thereby creating tight surface to surface contact between surfaces 12 and 14 due to the biasing force of compression spring 6. Furcher, movement of end surface 2a, in the direction opposite of direction L, causes end piece 16 to move, relatively, toward end piece 18 thereby compressing spring 7. This assures tight end-to-end contact between the light weight fibers supported by plug means I and socket means II.

In another embodiment of the invention guide sleeve 1 and the adapter cone 4 are designed as one piece, i.e. they are shaped on a lathe, and the longitudinal slits 1a end at a distance b ahead of 25 the free sleeve end 1b, whereby the adapter sleeve 5 surrounds the longitudinally slit guide sleeve 1 on all sides with a radial clearance, and the free end 5a of adapter sleeve 5 has a ramp 5b corresponding to adapter cone 4. Consequently, a secure and interference-proof engagement of the individual parts of the pin-and-socket connector with one another is guaranteed.

Other examples of pin-and-socket connectors and light wave conductors may be found in German Patent No. 28 53 649 and U.S. Pat. No. 4,818,055, entitled "Optical Fiber Splice Connector"; U.S. Pat. No. 4,818,061, entitled "Ferrule for Connecting Optical Fibers and Optical Connector using It"; U.S. Pat. No. 4,813,755, entitled "Method of Molding a Connector with Colley Retention"; U.S. Pat. No. 4,812,007, entitled "Optical Fiber Connector"; U.S. Pat. No. 4,812,008, entitled "Method and Apparatus for Connecting Optical Fibers"; U.S. Pat. No. 4,812,009, entitled "Optical Fiber Connector"; U.S. Pat. No. 4,807,957, entitled "Connector for Optical Fibers"; U.S. Pat. No. 4,807,958, entitled "Method of Interconnecting Optical Fiber Cables and Connectors"; U.S. Pat. No. 4,804,242, entitled "Connector for Optical Fiber"; U.S. Pat. No. 4,804,244, entitled "Connector for Optical Fiber"; U.S. Pat. No. 4,802,726, entitled "Methods of and Apparatus for Reconfiguring Optical Fiber Connector Components and Products Produced Thereby"; U.S. Pat. No. 4,801,191, entitled "Connecting Section for Optical Fiber Cable"; U.S. Pat. No. 4,799,759, entitled "Fiber Optic Connector"; U.S. Pat. No. 4,798,440, entitled "Fiber Optic Connector Assembly"; U.S. Pat.

No. 4,796,969, entitled "Fiber Optic Relay Connector"; U.S. Pat. No. 4,795,229, entitled "Strain Relief Assembly for Optical Fiber Connector"; and U.S. Pat. No. 4,795,230, entitled "Device and Process for Spreading Optical Fibers Emerging from a Cable to be Connected". All of the above-mentioned U.S. patents are incorporated herein by reference as if the texts thereof were fully set forth herein.

In summing up, an aspect of the invention resides in a pin-and-socket connector for light wave conductors with an apparatus for the automatic axial alignment of the plug pins 2, 3 which is mounted in an essentially flexible manner in the longitudinal direction L of the housing in a sleeve 1 or similar device, and which holds the ends of the fiber line E, characterized by the fact that the guide sleeve 1 for the plug pins 2, 3 has, on its jacket surface, longitudinal slits 1a and an adapted cone 4 located in the vicinity of the end surfaces 2a, 3a in contact with one another of the plug pins 2, 3, and during the insertion process, the adapter cone 4 is at least partly surrounded by an adapter sleeve 5 after mutual contact has been made between the plug pin end surfaces 2a, 3a.

Another aspect of the invention resides in that the longitudinally slit guide sleeve 1, 1a together with an adapter cone 4 and one plug pin 2 axially supported by means of a spring 6, sits in one of the pin-and-socket connector halves I and the adapter sleeve 5 together with the non-elastically mounted plug pin 3 sits in the other half II of the pin-and-socket connector.

Still another aspect of the invention resides in that the longitudinally slit guide sleeve 1, 1a is also guided so that it can move in the axial direction by means of an additional spring 7 in the corresponding plug housing 8.

A further aspect of the invention resides in that the adapter sleeve 5 encloses the longitudinally slit sleeve 1, 1a on all sites with a radial clearance a, and the free end 5a of the adapter sleeve 5 has a ramp surface 5b corresponding to the adapter cone 4.

A still further aspect of the invention resides in that the guide sleeve 1 and adapter cone 4 are designed as one piece, e.g., are shaped on a lathe, and the longitudinal slits 1a end at a distance b ahead of the free end 1b of the sleeve.

The invention as described hereinabove in the context of a preferred embodiment is not to be taken as limited to all of the provided details thereof, since modifications and variations thereof may be made without departing from the spirit and scope of the invention.

What is claimed is:

1. Connector for axially aligning light wave conductors such as fiber optic conductors which each have at least one end comprising:

socket means for supporting an end of at least a first light wave conductor in a first predetermined position; and plug means defining a longitudinal axis and configured to be releasably connected to said socket means for supporting an end of at least a second light wave conductor in a second predetermined position;

said plug means including guide sleeve means extending adjacent at least a portion of said longitudinal axis to facilitate said releasable connection of said socket means to said plug means;

said guide sleeve means including an at least partially generally conically configured first aligning means adjacent at least one end of said at least second light wave conductor;

said socket means including second aligning means for being in at least partial surrounding relation with respect to said first aligning means and for being adjacent at least one end of said at least first light wave conductor and configured to cooperate with said first aligning means for relatively aligning said first predetermined position with respect to said second predetermined position to axially align an end of one of said at least first light wave conductors with an end of one of said at least second light wave conductors by said second aligning means applying a radially inward force on said first aligning means by compression action between said generally conically shaped first aligning means and said second aligning means.

2. The conductor according to claim 1, wherein said first aligning means is wedge means.

3. The connector according to claim 2, further including:

first plug pin means within said socket means for supporting at least one of said at least first light wave conductors within said socket means; and second plug pin means within said plug means for supporting at least one of said at least second light wave conductors within said plug means.

4. The connector according to claim 3, wherein said guide sleeve means includes slit means for facilitating receipt of said radially inward force on said first aligning means by said second aligning means.

5. The connectors according to claim 4, further including biasing means for being connected to said second plug pin means for biasing said second plug pin means in a direction parallel to said longitudinal axis.

6. The connector according to claim 5, wherein said biasing means is spring means.

7. The connector according to claim 6, wherein said spring means is compression spring means.

8. The connector according to claim 6, wherein said spring means includes first and second springs.

* * * * *

UNITED STATES PATENT AND TRADEMARK OFFICE
CERTIFICATE OF CORRECTION

PATENT NO. : 4,964,690
DATED : October 23, 1990
INVENTOR(S) : Jürgen LAPPÖHN and Franz CZESCHKA It is certified that error appears in the above-identified patent and that said Letters Patent is hereby corrected as shown below:

Under the Abstract section, indicated by the INID code [57], on line 3, after the first instance of 'the', delete "pug" and insert --plug--.
    In column 2, beginning on line 3 and ending on line 8, please connect the sentence beginning with 'In one embodiment of this...'.
    In column 2, line 37, after 'of', delete "25".

Signed and Sealed this

Fourth Day of February, 1992

Attest:

HARRY F. MANBECK, JR.

*Attesting Officer*    *Commissioner of Patents and Trademarks*